(12) United States Patent
Kwak et al.

(10) Patent No.: US 10,641,453 B2
(45) Date of Patent: May 5, 2020

(54) LAMP FOR VEHICLE AND VEHICLE

(71) Applicant: ZKW Group GmbH, Wieselburg (AT)

(72) Inventors: Kiwon Kwak, Seoul (KR); Jinwoo Park, Seoul (KR)

(73) Assignee: ZKW Group GmbH, Wieselburg (AT)

(*) Notice: Subject to any disclaimer, the term of this patent is extended or adjusted under 35 U.S.C. 154(b) by 20 days.

(21) Appl. No.: 15/858,941

(22) Filed: Dec. 29, 2017

(65) Prior Publication Data
US 2019/0011106 A1 Jan. 10, 2019

(30) Foreign Application Priority Data

Jul. 10, 2017 (KR) .......................... 10-2017-0087193

(51) Int. Cl.
*F21S 41/43* (2018.01)
*F21S 41/20* (2018.01)
*B60Q 1/00* (2006.01)
*F21S 43/20* (2018.01)
*G01S 13/93* (2020.01)
*G01S 13/931* (2020.01)

(52) U.S. Cl.
CPC ............ *F21S 41/43* (2018.01); *B60Q 1/0023* (2013.01); *F21S 41/28* (2018.01); *F21S 41/285* (2018.01); *F21S 43/26* (2018.01); *G01S 13/931* (2013.01); *G01S 2013/9364* (2013.01); *G01S 2013/9367* (2013.01)

(58) Field of Classification Search
CPC ...... B60Q 1/0023; F21S 41/28; F21S 41/285; F21S 41/43; F21S 43/26; G01S 13/931; G01S 2013/9364; G01S 2013/9367
See application file for complete search history.

(56) References Cited

U.S. PATENT DOCUMENTS

| 4,631,642 A | * | 12/1986 | Brun | ...................... | G02B 6/0006 |
| | | | | | 362/581 |
| 5,158,350 A | * | 10/1992 | Sato | ....................... | F21S 41/28 |
| | | | | | 362/538 |
| 5,353,154 A | * | 10/1994 | Lutz | ....................... | F21S 43/33 |
| | | | | | 359/582 |
| 5,394,310 A | * | 2/1995 | Iwasaki | ............... | B60Q 1/0041 |
| | | | | | 362/243 |

(Continued)

FOREIGN PATENT DOCUMENTS

| DE | 19632252 | 1/1998 |
| EP | 1026031 | 8/2000 |

(Continued)

OTHER PUBLICATIONS

European Search Report in European Appln. No. 18178473.7, dated Nov. 28, 2018, 8 pages.

*Primary Examiner* — Tsion Tumebo
(74) *Attorney, Agent, or Firm* — Fish & Richardson P.C.

(57) ABSTRACT

A lamp for a vehicle, the lamp that includes: at least one light emitting unit; a sensor that is disposed around the at least one light emitting unit, and that is configured to generate data regarding an object located outside the vehicle; a housing configured to accommodate the at least one light emitting unit and the sensor, the housing defining an opening through which light that is emitted from the light emitting unit is projected to an outside of the vehicle; and a cover lens configured to cover the opening of the housing is disclosed.

21 Claims, 15 Drawing Sheets

(56) References Cited

U.S. PATENT DOCUMENTS

| | | | | |
|---|---|---|---|---|
| 5,707,132 | A * | 1/1998 | Ooki | B29C 45/0025 362/522 |
| 5,955,752 | A * | 9/1999 | Fukaya | G01S 7/032 257/275 |
| 6,296,382 | B1 * | 10/2001 | Hamelbeck | B60Q 1/2607 362/544 |
| 7,255,467 | B2 * | 8/2007 | Ishida | H01L 33/54 362/520 |
| 8,851,730 | B2 * | 10/2014 | Tatara | B60Q 1/0023 362/546 |
| 9,581,739 | B2 * | 2/2017 | Sahlin | G02B 5/045 |
| 9,711,862 | B2 * | 7/2017 | Fujita | H01Q 15/02 |
| 2002/0018349 | A1 * | 2/2002 | Aikawa | B60Q 1/2607 362/520 |
| 2007/0008286 | A1 * | 1/2007 | Theytaz | G06F 3/0317 345/166 |
| 2008/0029701 | A1 * | 2/2008 | Onozawa | B60Q 1/0023 250/332 |
| 2012/0039084 | A1 * | 2/2012 | Eckhardt | G02B 5/124 362/516 |
| 2012/0268940 | A1 * | 10/2012 | Sahlin | G02B 5/045 362/290 |
| 2017/0190151 | A1 * | 7/2017 | Hamano | B32B 17/06 |

FOREIGN PATENT DOCUMENTS

| | | |
|---|---|---|
| EP | 2653344 | 10/2013 |
| FR | 2641241 | 7/1990 |
| JP | 2008243515 | 10/2008 |
| JP | 2015011977 | 1/2015 |
| KR | 1020140001268 | 1/2014 |
| KR | 1020170000666 | 1/2017 |

\* cited by examiner

LAMP FOR VEHICLE AND VEHICLE

CROSS-REFERENCE TO RELATED APPLICATION

This application claims the priority benefit of Korean Patent Application No. 10-2017-0087193, filed on Jul. 10, 2017 in the Korean Intellectual Property Office, the disclosure of which is incorporated herein by reference.

TECHNICAL FIELD

The present disclosure relates to a lamp for vehicle, and a lamp.

BACKGROUND

A vehicle is an apparatus that moves in a direction desired by a user riding therein. A common example of a vehicle is an automobile.

The vehicle typically includes various lamps. For example, a vehicle typically includes a head lamp, a rear combination lamp, and a fog lamp.

SUMMARY

In general, one innovative aspect of the subject matter described in this specification can be implemented in a lamp for a vehicle, comprising: at least one light emitting unit; a sensor that is disposed around the at least one light emitting unit, and that is configured to generate data regarding an object located outside the vehicle; a housing configured to accommodate the at least one light emitting unit and the sensor, the housing defining an opening through which light that is emitted from the light emitting unit is projected to an outside of the vehicle; and a cover lens configured to cover the opening of the housing.

The foregoing and other implementations can each optionally include one or more of the following features, alone or in combination. In particular, one implementation includes all the following features in combination. The cover lens comprises: a first lens structure having a first refractive index; and a second lens structure configured to contact at least one surface of the first lens structure, and having a second refractive index that is different from the first refractive index of the first lens structure. The second lens structure is arranged closer to an interior of the housing relative to the first lens structure such that light emitted from the at least one light emitting unit passes through the second lens structure before passing through the first lens structure, and the second refractive index of the second lens structure is smaller than the first refractive index of the first lens structure. At least part of the first lens structure has a thickness that is greater than a thickness of the second lens structure. The second lens structure is configured to be arranged in close contact with at least one surface of the first lens structure. An edge of the second lens structure is formed in a curved shape. The first lens structure comprises: a first transparent member having a first thickness; a second transparent member that is adjacent to the first transparent member along a lateral direction of the lamp and that has a second thickness greater than the first thickness of the first transparent member, and formed to have a step with respect to the first transparent member; and a stepped portion formed by a difference between the first thickness of the first transparent member and the second thickness of the second transparent member. The second lens structure is configured to contact a first surface of the second transparent member, and a side surface of the second lens structure extends from the stepped portion of the first lens structure towards an interior of the lamp. The second lens structure extends in a longitudinal direction thereof and along the lateral direction of the lamp to the stepped portion of the first lens structure. The first transparent member is configured to cover a first portion of the opening corresponding to the sensor, and the second transparent member is configured to cover a second portion of the opening corresponding to the at least one light emitting unit. The lamp further includes a bezel disposed between the sensor and the second lens structure. A first surface of the bezel is arranged to face the stepped portion of the first lens structure in the lateral direction of the lamp. The bezel is arranged to protrude in a direction toward the first transparent member further than the second lens structure. The bezel is composed of a non-transparent material. The lamp further includes a light leak prevention structure formed of a non-transparent material, wherein the cover lens comprises: a first transparent member configured to cover a first portion of the opening corresponding to the sensor; and a second transparent member configured to cover a second portion of the opening corresponding to the at least one light emitting unit, wherein the first transparent member and the second transparent member are arranged along a lateral direction of the lamp, and wherein light leak prevention structure is disposed between the first transparent member and the second transparent member. The lamp further includes a bezel arranged to be coupled with the light leak prevention structure. The lamp further includes at least one processor that is electrically connected to the at least one light emitting unit and to the sensor. The at least one processor is configured to control the at least one light emitting unit and the sensor in an alternating manner in which the at least one light emitting unit and the sensor are activated in different time periods. The sensor comprises at least one of a camera, a Light Detection And Ranging (LIDAR) sensor, a Radio Detection And Ranging (RADAR) sensor, an ultrasonic sensor, or an infrared sensor. The cover lens comprises: a first transparent member configured to cover a first portion of the opening corresponding to the sensor; a second transparent member configured to cover a second portion of the opening corresponding to the at least one light emitting unit; and a bent portion arranged between and connecting the first transparent member and the second transparent member, wherein the first transparent member and the second transparent member are arranged along a lateral direction of the lamp, and wherein the bent portion is formed so that second transparent member is arranged closer to an interior of the lamp relative to the first transparent member. The cover lens further comprises a corrugation portion formed on at least one surface of the second transparent member adjacent to the bent portion.

In general, another innovative aspect of the subject matter described in this specification can be implemented in a vehicle comprising: a plurality of wheels; a power source configured to power a rotation of at least one of the plurality of wheels; and a lamp comprising: at least one light emitting unit; a sensor that is disposed around the at least one light emitting unit, and that is configured to generate data regarding an object located outside the vehicle; a housing configured to accommodate the at least one light emitting unit and the sensor, the housing defining an opening through which light that is emitted from the light emitting unit is projected to an outside of the vehicle; and a cover lens configured to cover the opening of the housing.

The present disclosure has been made in view of the above problems, and it is one object of the present disclosure to provide a lamp for a vehicle, which is integrally formed with a sensor and configured such that light emitted by a light emitting unit is prevented to cause noise to the sensor.

It is another object of the present disclosure to provide a vehicle including the lamp.

In some scenarios, the implementations of the present disclosure may one or more effects as follows.

First, implementations disclosed herein may help ensure that light emitted by the light emitting unit is prevented from interfering with the sensor.

Second, implementations disclosed herein may enable a sensor to be integrally formed with a lamp, while mitigating degradation of performance of the sensor.

Third, implementations disclosed herein may improve design freedom of the lamp and the vehicle.

Effects of the present disclosure are not limited to the aforementioned effects and other effects will be clearly understood by those skilled in the art from the claims.

DETAILED DESCRIPTION

In some implementations, a vehicle is equipped with one or more sensors that are configured to sense an object located outside the vehicle.

In some scenarios, such sensors may be located inside the vehicle, for example, to be protected from the outside environment and foreign substances. However, sensors that are located inside the vehicle may be limited in accurately sensing objects outside the vehicle. For example, the accuracy of sensors that are located inside the vehicle may be limited by interference caused by other components in the vehicle.

Implementations disclosed herein enable systems and techniques that provide a sensor that is protected from the outside environment while maintaining accuracy of the sensor by protecting the sensor from interference caused by other components in the vehicle.

A vehicle as described in this disclosure may include any suitable motorized vehicle, such as an automobile and a motorcycle. Hereinafter, a description will be given based on an example of an automobile.

A vehicle as described in this disclosure may be powered by any suitable source of power, and may include an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
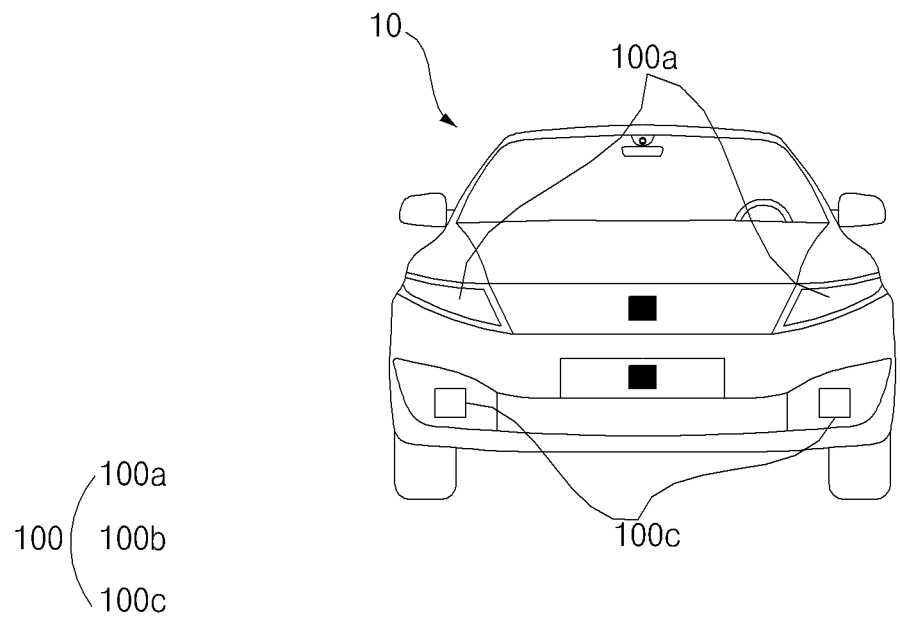
FIG. 1 is a diagram illustrating the exterior appearance of a vehicle according to an implementation.
Figure 1:
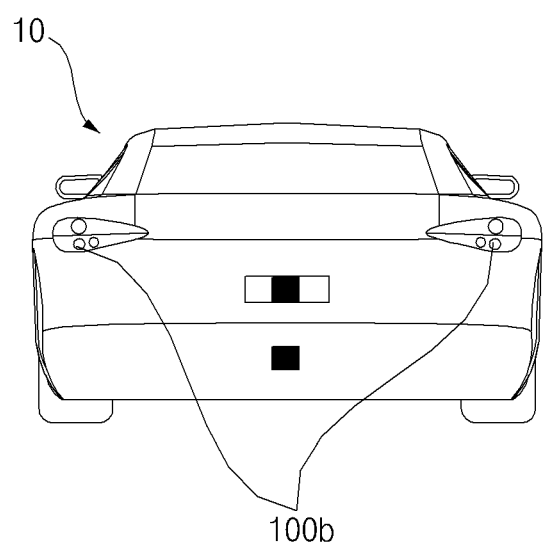

FIG. 1 is a diagram illustrating the exterior appearance of a vehicle according to an implementation.

Referring to FIG. 1, a vehicle 10 may include a lamp 100 for vehicle.

The lamp 100 may include a head lamp 100a, a rear combination lamp 100b, and a fog lamp 100c.

The lamp 100 may further include a room lamp, a turn signal lamp, a daytime running lamp, a back lamp, and a positioning lamp.

In the following description, a head lamp 100a or a rear combination lamp 100b is described as an example of the lamp 100.

Under the control of a processor 170 (see FIG. 2), t light generation unit 160 (see FIG. 2) may generate light to implement the head lamp 100a or the rear combination lamp 100b.

Meanwhile, the term "overall length" means the length from the front end to the rear end of the vehicle 10, the term "overall width" means the width of the vehicle 10, and the term "overall height" means the height from the bottom of the wheel to the roof. In the following description, the term "overall length direction L" may mean the reference direction for the measurement of the overall length of the vehicle 10, the term "overall width direction W" may mean the reference direction for the measurement of the overall width of the vehicle 10, and the term "overall height direction H" may mean the reference direction for the measurement of the overall height of the vehicle 10.

Figure 2:
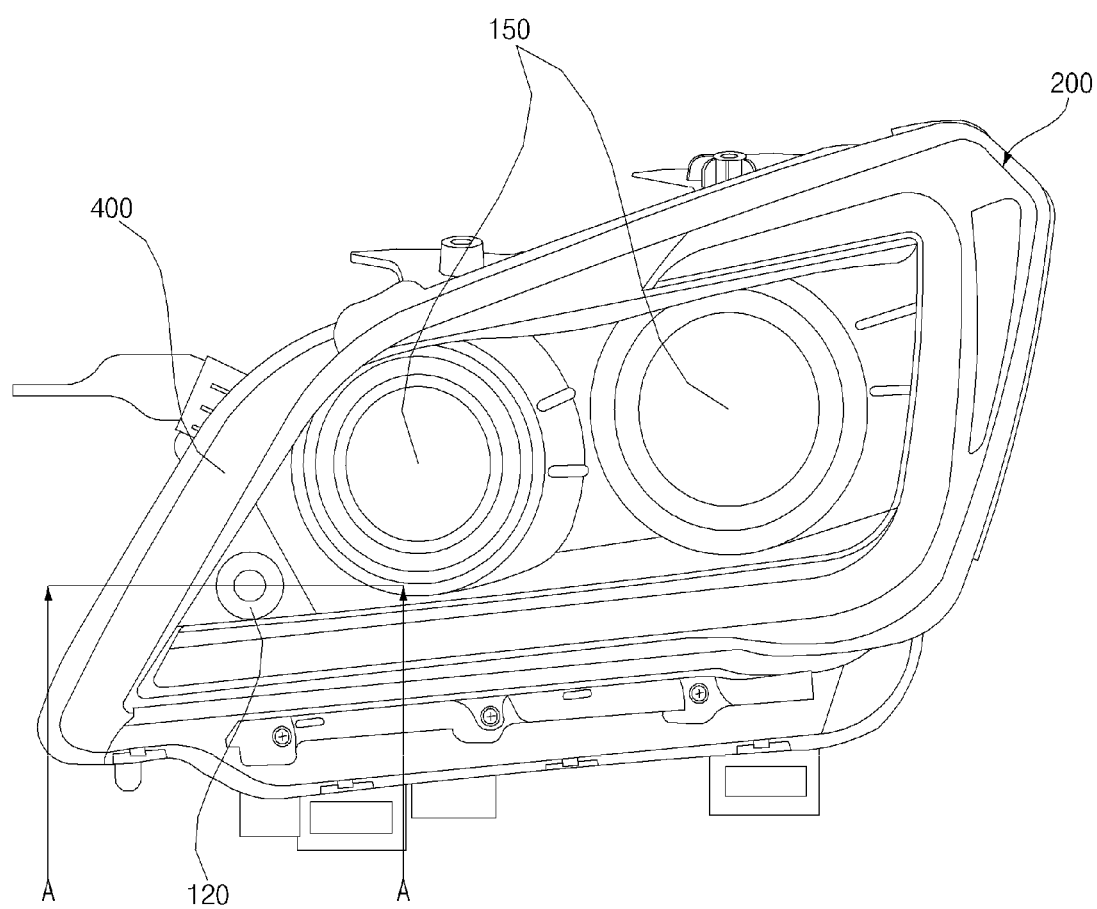
FIG. 2 illustrates a head lamp as an example of a lamp for a vehicle according to an implementation.

FIG. 2 illustrates a head lamp as an example of a lamp for a vehicle according to an implementation.

Referring to FIG. 2, the lamp 100 may include at least one light emitting unit 150, a sensor 120, a housing 400, and a cover lens 200.

The head lamp 100a may include at least one light emitting unit 150, a sensor 120, a housing 400, and a cover lens 200.

The light emitting unit 150 may include a light source. The light source may include a constituent element for generating light based on electrical energy.

The light source may include at least one selected from among a metal filament lamp, a halogen bulb, a High Intensity Discharge (HID) lamp, a neon gas discharge lamp, a Light Emitting diode (LED) lamp, a micro LED, and a laser diode.

The sensor 120 may be disposed around the light emitting unit 150. For example, the sensor 120 may be disposed outside a periphery of a region through which light emitted from the light emitting unit 150 is projected to an outside of the vehicle.

The sensor 120 may be configured to sense an object located outside the vehicle 10. The sensor 120 may generate data about an object located outside the vehicle 10.

The sensor 120 may be configured to sense various types of objects related to travelling of the vehicle 10. For example, the object may include a line on the road, another vehicle, a pedestrian, a two-wheeled vehicle, a traffic signal, etc.

The sensor 120 may be electrically connected to at least one processor, such as at least one processor 170, included in the vehicle 10.

The sensor 120 may operate based on a signal generated by the at least one processor 170.

The sensor 120 may include, for example, at least one of a camera, a Radio Detection And Ranging (RADAR) sensor, a Light Detection And Ranging (LIDAR) sensor, a ultrasonic sensor, or an infrared sensor.

The camera may be located at an appropriate position outside the vehicle 10 in order to acquire images of the outside of the vehicle 10. The camera may be a mono camera, a stereo camera, or the like.

Using various image processing algorithms, the camera may acquire information on a location of an object, and information on a distance to the object, or information on a speed relative to the object.

For example, the camera may acquire the information on a distance to an object and information on a speed relative to the object based on a variation in size of the object over time in acquired images.

For example, the camera may acquire information on a distance to the object or information on a speed relative to the object by employing a pin hole model or by profiling a road surface.

For example, the camera may acquire information on a distance to the object and information on a speed relative to the object based on information on disparity in stereo images acquired from the stereo camera.

For example, the camera may be disposed near a front windshield in the vehicle 10 in order to acquire images of the front of the vehicle 10. Alternatively, the camera may be disposed around a front bumper or a radiator grill.

For example, the camera may be disposed near a rear glass in the vehicle 10 in order to acquire images of the rear of the vehicle 10. Alternatively, the camera may be disposed around a rear bumper, a trunk, or a tailgate.

For example, the camera may be disposed near at least one of the side windows in the vehicle 10 in order to acquire images of the side of the vehicle 10. Alternatively, the camera may be disposed around a side mirror, a fender, or a door.

The RADAR sensor may include an electromagnetic wave transmission unit and an electromagnetic wave reception unit. The RADAR sensor may be realized as a pulse RADAR sensor or a continuous wave RADAR sensor depending on the principle of emission of an electronic wave. In addition, the RADAR sensor may be realized as a Frequency Modulated Continuous Wave (FMCW) type RADAR sensor or a Frequency Shift Keying (FSK) type RADAR sensor depending on the waveform of a signal.

The RADAR sensor may detect an object through the medium of an electromagnetic wave by employing a time of flight (TOF) scheme or a phase-shift scheme, and may detect a location of the detected object, the distance to the detected object, and the speed relative to the detected object.

The RADAR sensor may be located at an appropriate position outside the vehicle 10 in order to sense an object located in front of the vehicle 10, an object located to the rear of the vehicle 10, or an object located to the side of the vehicle 10.

The LIDAR sensor may include a laser transmission unit and a laser reception unit. The LIDAR sensor may be implemented by the TOF scheme or the phase-shift scheme.

The LIDAR sensor may be implemented as a drive-type LIDAR sensor or a non-drive type LIDAR sensor.

When implemented as the drive-type LIDAR sensor, the LIDAR sensor may rotate by a motor and detect an object in the vicinity of the vehicle 10.

When implemented as the non-drive type LIDAR sensor, the LIDAR sensor may utilize light steering technique to detect an object located within a predetermined distance from the vehicle 10. The vehicle 10 may include a plurality of non-drive type LIDAR sensors.

The LIDAR sensor may detect an object through the medium of laser light by employing the TOF scheme or the phase-shift scheme, and may detect a location of the detected object, a distance to the detected object, and a speed relative to the detected object.

The LIDAR sensor may be located at an appropriate position outside the vehicle 10 in order to sense an object located in front of the vehicle 10, an object located to the rear of the vehicle 10, or an object located to the side of the vehicle 10.

The ultrasonic sensor may include an ultrasonic wave transmission unit and an ultrasonic wave reception unit. The ultrasonic sensor may detect an object based on an ultrasonic wave, and may detect a location of the detected object, a distance to the detected object, and a speed relative to the detected object.

The ultrasonic sensor may be located at an appropriate position outside the vehicle 10 in order to detect an object located in front of the vehicle 10, an object located to the rear of the vehicle 10, and an object located to the side of the vehicle 10.

The infrared sensor may include an infrared light transmission unit and an infrared light reception unit. The infrared sensor may detect an object based on infrared light, and may detect a location of the detected object, a distance to the detected object, and a speed relative to the detected object.

The infrared sensor may be located at an appropriate position outside the vehicle 10 in order to sense an object located in front of the vehicle 10, an object located to the rear of the vehicle 10, or an object located to the side of the vehicle 10.

The housing 400 may define the exterior of the lamp 100.

The housing 400 may include an opening that is covered by the cover lens 200. The opening may be defined to allow light that is emitted from the lamp 100 to be projected to an outside of the vehicle 10.

For example, when the lamp 100 is implemented as the head lamp 100*a*, the opening may be formed towards a forward direction of the vehicle 10.

The housing 400 may accommodate a plurality of constituent elements included in the head lamp 100*a*. For example, the housing 400 may accommodate both the light emitting unit 150 and the sensor 120.

The cover lens 200 may cover the opening formed in the housing 400. The cover lens 200 may be formed of a transparent material, thus allowing light that is emitted from the light emitting unit 150 to be projected to an outside of the vehicle 10.

In some implementations, a space is defined by the housing 400 and the cover lens 200, and the light emitting unit 150 and the sensor 120 may be disposed in the space.

Figure 3:
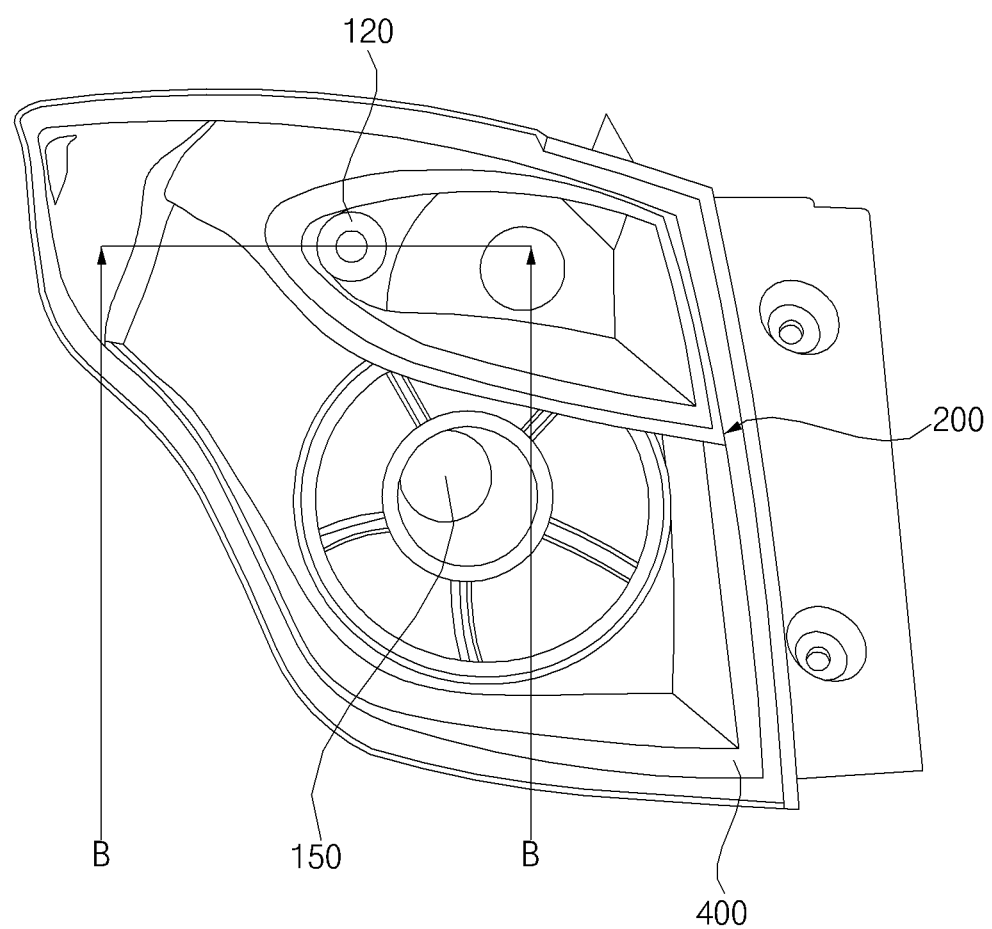
FIG. 3 illustrates a rear combination lamp as an example of a lamp for a vehicle according to an implementation.

FIG. 3 illustrates a rear combination lamp as an example of a lamp for a vehicle according to an implementation.

Referring to FIG. 3, the lamp may include at least one light emitting unit 150, a sensor 120, a housing 400, and a cover lens 200.

The rear combination lamp 100*b* may include at least one light emitting unit 150, a sensor 120, a housing 400, and a cover lens 200.

The light emitting unit 150 and the sensor 120 may be the same as described with reference to FIG. 2.

The housing 400 may define the exterior of the lamp 100.

The housing 400 may include an opening. The opening may be covered by the cover lens 200.

If the lamp 100 is implemented as the rear combination lamp 100b, the opening may be formed rearward of the vehicle 10.

The housing 400 may accommodate a plurality of constituent elements included in the rear combination lamp 100b.

The housing 400 may accommodate the light emitting unit 150 and the sensor 120.

The cover lens 200 may cover the opening formed in the housing.

The cover lens 200 may be formed of a transparent material.

The housing 400 and the cover lens 200 form a space, and the light emitting unit 150 and the sensor 120 may be disposed in the space.

Figure 4:
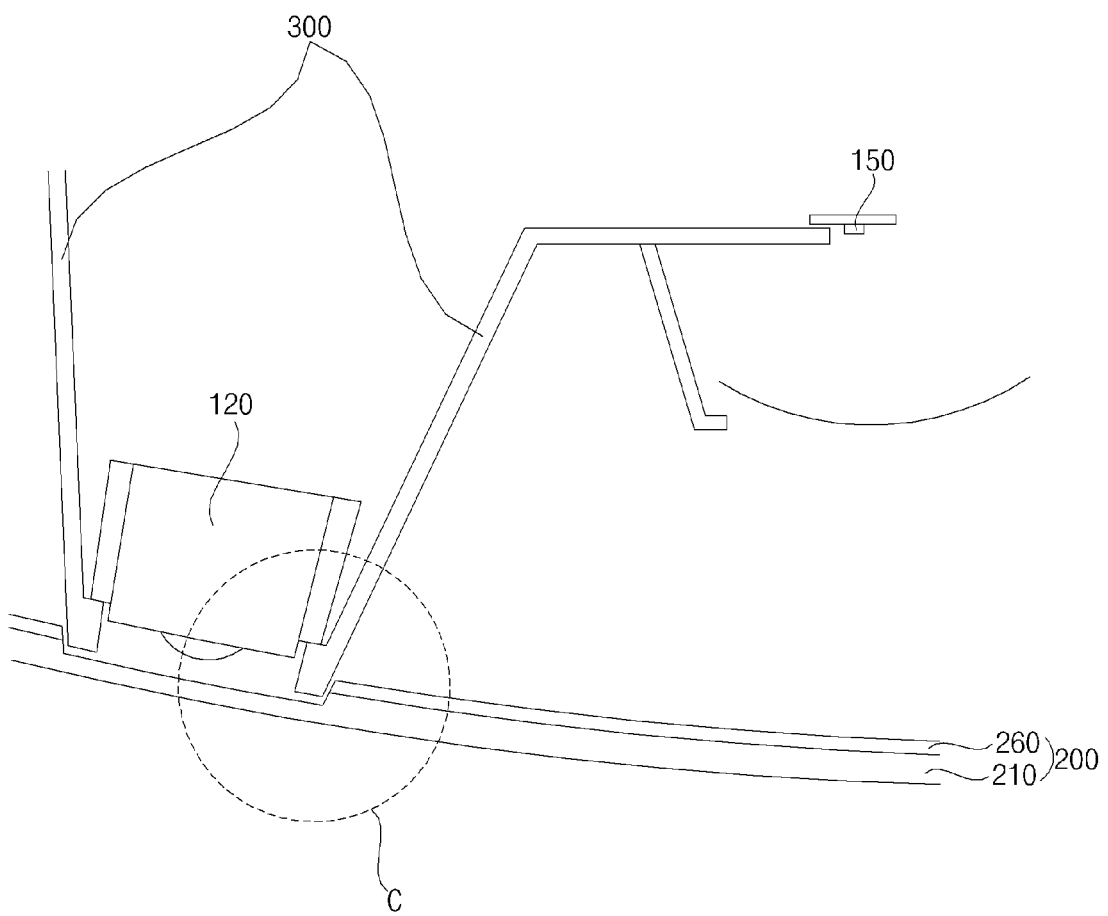
FIG. 4 is a cross-sectional view cut along line A-A of FIG. 2 or line B-B of FIG. 3.

FIG. 4 is a cross-sectional view cut along line A-A of FIG. 2 or line B-B of FIG. 3.

FIG. 4 is a transverse cross-sectional view (a horizontal cross-sectional view).

Figure 5:
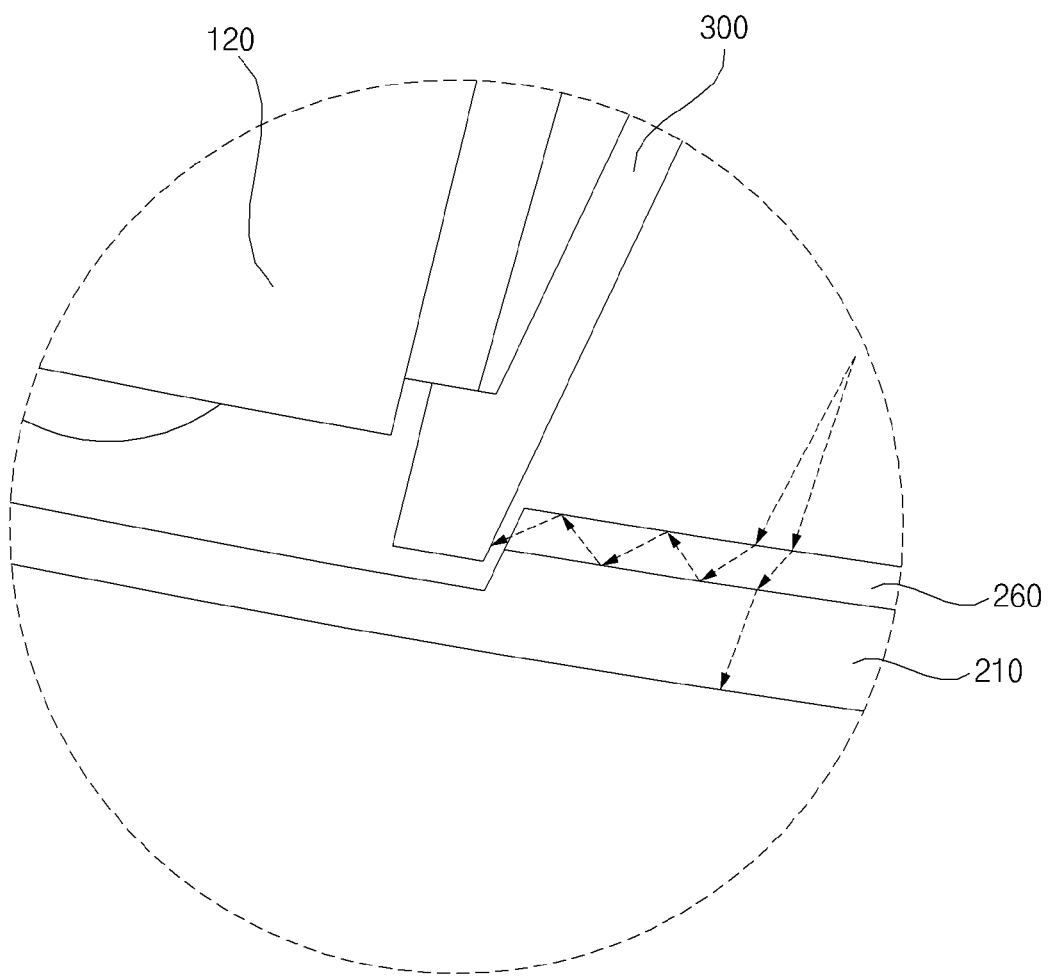
FIGS. 5 and 6 are enlarged view of portion C shown in FIG. 4.
Figure 6:
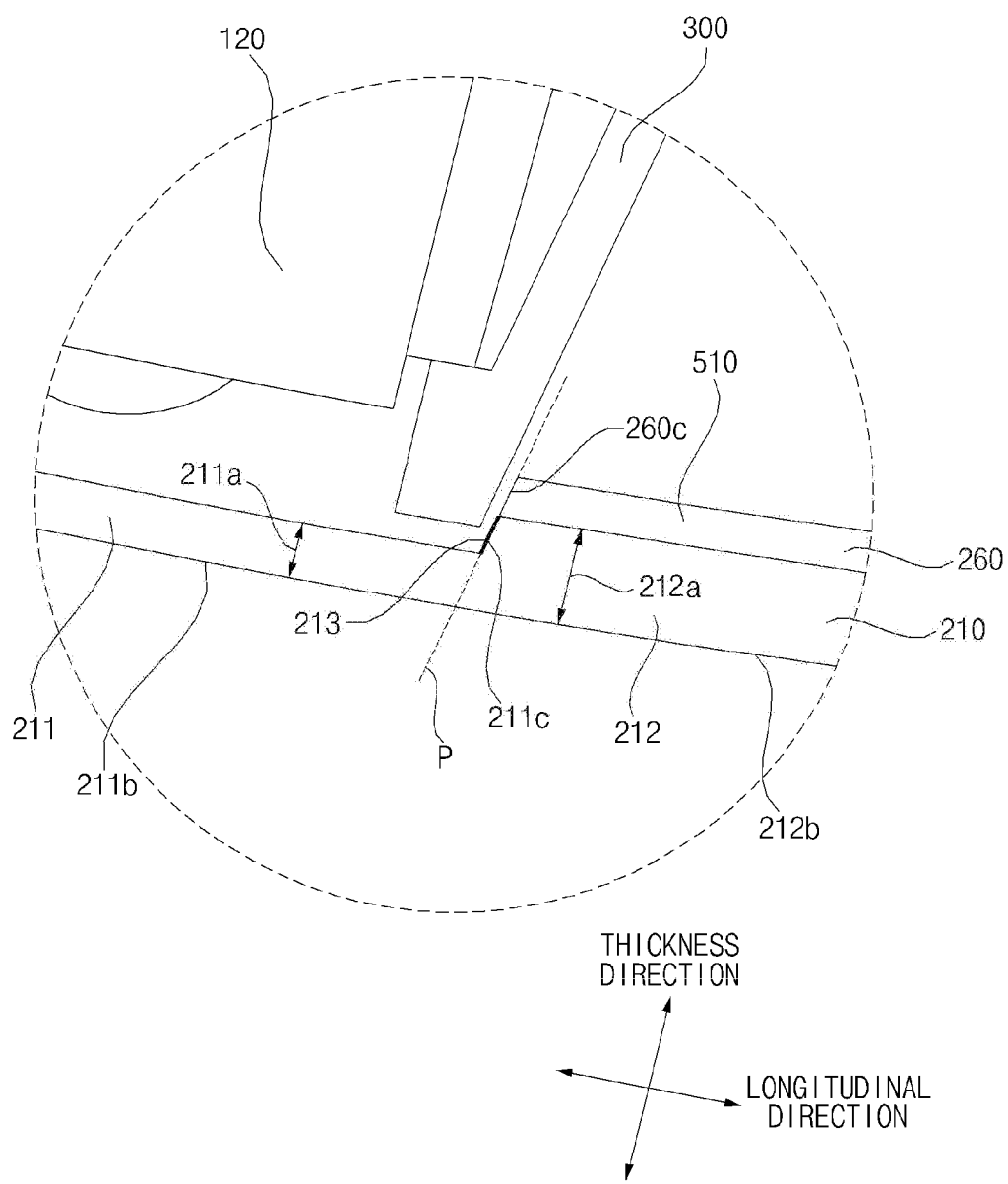

FIGS. 5 and 6 are enlarged view of portion C shown in FIG. 4.

Referring to FIGS. 4 to 6, the cover lens 200 may include a first lens 210 and a second lens 260.

The first lens 210 may be at a greater distance to the light emitting unit 150 than the second lens 260.

At least one surface of the first lens 210 may contact the second lens 260.

The first lens 210 may have a refractive index different from that of the second lens 260.

The refractive index of the first lens 210 may be greater than a refractive index of the second lens 260.

The first lens 210 may include a clear lens. As such, the first lens 210 may be configured to transmit light that is projected from the light emitting unit 150 to be projected to an outside of the lamp.

As shown in the example of FIG. 6, the first lens 210 may include a first transparent member 211, a second transparent member 212, and a stepped portion 213. The first and second transparent members 211 and 212 may be arranged along a lateral direction of the lamp (e.g., along a direction extends from one lateral side of the lamp to another lateral side of the lamp). In some implementations, the first and second transparent members 211 and 212 may be arranged contiguously along the lateral direction of the lamp. In some implementations, the first and second transparent members 211 and 212 may be separated by one or more structures that are arranged therebetween.

The first transparent member 211 may have a first thickness 211a. The first transparent member 211 may cover the sensor 120.

The second transparent member 212 may have a second thickness 212a. In some implementations, the second thickness 212a may be greater than the first thickness 211a of the first transparent member 211. As such, the second transparent member 212 may be formed to have a step with respect to the first transparent member 211, as shown in the example of FIG. 6.

The second transparent member 212 may cover the light emitting unit 150.

The stepped portion 213 may be formed by the difference in thickness between the first transparent member 211 and the second transparent member 212.

The stepped portion 213 may be formed inside the first lens 210.

The stepped portion 213 may be formed on a surface of the first lens 210 which faces the sensor 120 and the light emitting unit 150.

The stepped portion 213 may be formed to extend in an overall height direction.

The stepped portion 213 may be defined as a side surface portion of the second transparent member 212.

Meanwhile, an outer side surface 212b of the second transparent member 212 may extend from an outer side surface 211b of the first transparent member 211.

The outer side surface 211b of the first transparent member 211 and the outer side surface 212b of the second transparent member 212 may be located on the same plane or curved surface. In this case, a plane may be a virtual plane or curved surface.

The outer side surface 211b of the first transparent member 211 and the outer side surface 212b of the second transparent member 212 may appear seamless looking from the outside of the lamp 100.

The first lens 260 may be closer to the light emitting unit 150 than the first lens 210.

The second lens 260 may be disposed between the first lens 210 and the light emitting unit 150.

The second lens 260 may contact at least one surface of the first lens 210.

The second lens 260 may have a refractive index different from that of the first lens 210.

The refractive index of the second lens 260 may be smaller than a refractive index of the first lens 210.

The second lens 260 may have a particular color depending on which lamp is implemented by the lamp 100. The second lens 260 may change a wavelength of light generated by the light emitting unit 150.

If light is emitted from a medium with a small refractive index toward a medium with a great refractive index, total reflection does not occur.

As the first lens 210 has a refractive index greater than that of the second lens 260, light emitted by the light emitting unit 150 is not totally internally reflected by the first lens 210. In this case, if the light generated by the light emitting unit 150 reaches the first lens 210, the light is emitted only toward the outside of the first lens 210 (for example, the front or rear side of the vehicle). Thus, light does not leak inside the first lens 210. Therefore, the light generated by the light emitting unit 150 does not cause noise to the sensor 120.

If light is emitted from a medium with a small refractive index toward a medium with a great refractive index, light is totally internally reflected by the medium with the small refractive index.

As the first lens 210 has a refractive index greater than that of the second lens 260, light emitted from the light emitting unit 150 may be totally internally reflected by the second lens 260. Light may leak inside the second lens 260.

A leakage of light inside the second lens 260 may be prevented by a bezel 300 which will be described later.

Meanwhile, in some implementations, at least part of the first lens 210 may be formed thicker than the second lens 260.

For example, the second transparent member 212 of the first lens 210 may be formed thicker than the second lens 260.

Even in the case where the first lens 210 and the second lens 260 are formed of the same material, it is possible to induce difference in a refractive index between the first lens 210 and the second lens 260 by forming at least part of the first lens 210 thicker than the second lens 260. A refractive index of the first lens 210 may be greater than a refractive index of the second lens 260. The refractive index of the second lens 260 may be smaller than the refractive index of the first lens 210.

In some implementations, at least one surface of the first lens 210 may be arranged to be in close contact with the second lens 260. For example, the second transparent member 212 may be arranged to be in close contact with the second lens 260.

The second lens 260 may be arranged to be in close contact with at least one surface of the first lens 210. For example, the second lens 260 may be arranged in close contact with the second transparent member 212.

In some scenarios, the first lens 210 and the second lens 260 are formed by an insert-injection process, by which the second lens 260 may be arranged in close contact with at least one surface of the first lens 210.

In some scenarios, the first lens 210 and the second lens 260 are bonded to each other by a transparent adhesive, by which the second lens 260 may be arranged in close contact with at least one surface of the first lens 210.

In some implementations, the first lens 210 and the second lens 260 may be arranged in close contact such that there is no air gap between the first lens 210 and at least one surface of the second lens 260.

The second lens 260 may contact one surface of the second transparent member 212.

A side surface 260c of the second lens 260 may extend from the stepped portion 213. The side surface 260c of the second lens 260 may extend from a side surface 212c of the second transparent member 212.

The side surface 260c of the second lens 260 and the side surface 212c of the second transparent member 212 may not be formed to have a step.

The side surface 260c of the second lens 260 and the side surface 212c of the second transparent member 212 may be disposed on the same plane P. The plane P may be a virtual plane.

The second lens 260 may extend in a longitudinal direction to the stepped portion 213. For example, as shown in the example of FIG. 6, the second lens 260 may extend along a lateral direction of the lamp towards the stepped portion 213.

Figure 7:
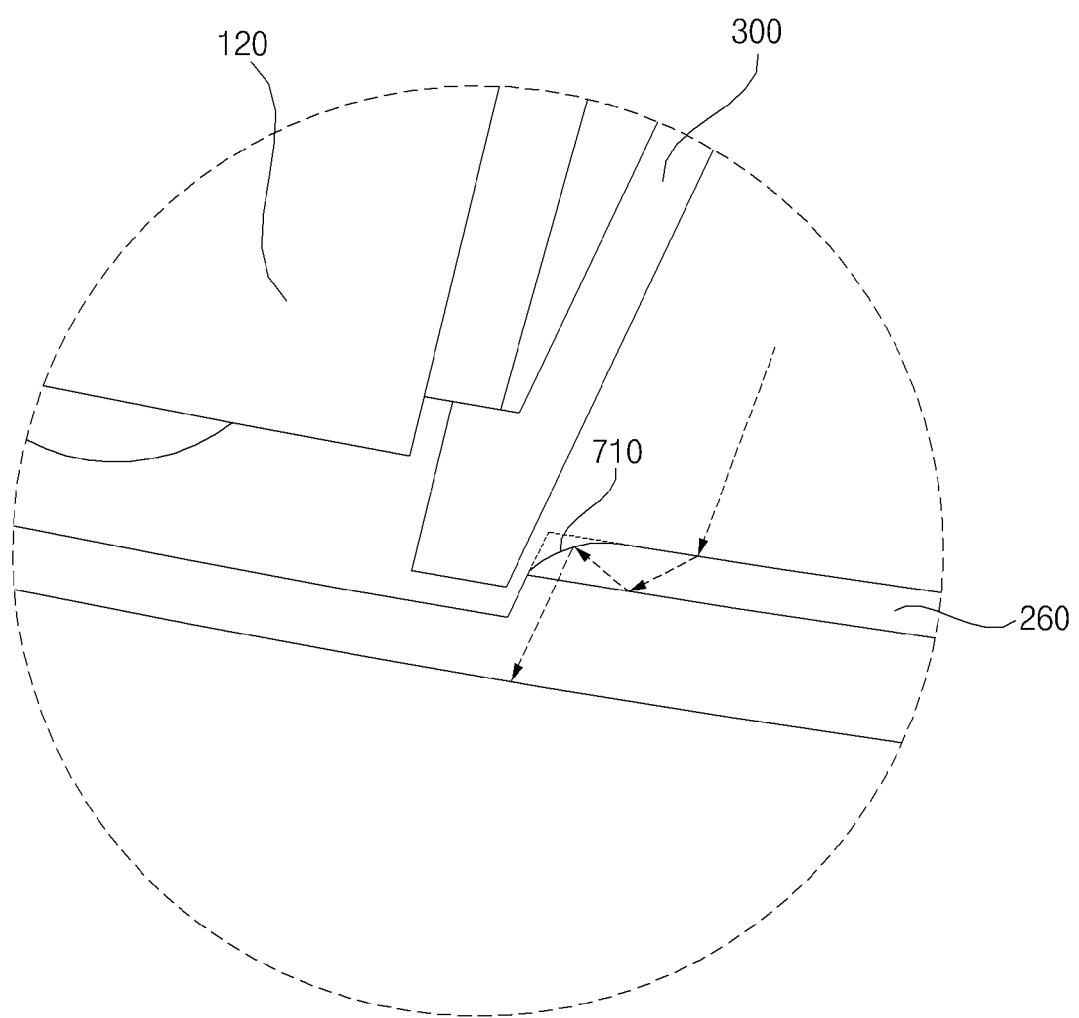
FIG. 7 is a diagram for explaining a cover lens according to an implementation.

FIG. 7 is a diagram for explaining a cover lens according to an implementation.

Referring to FIG. 7, an edge 710 of the second lens 260 may be formed around.

For example, the edge 710 of the second lens 260 closest to the sensor 120 may be formed round.

A transverse cross-section (a horizontal cross-section) of the edge 710 may be an arc shape of a circle having a particular radius.

As described above, light may leak inside the second lens 260. In this case, as the edge 710 is formed round, an optical path may be changed from a direction toward the sensor 120 to a direction toward the outside of the vehicle 10 (e.g., the front or rear side of the vehicle 10).

FIGS. 8A to 8D are diagrams for explaining a cover lens according to an implementation.

Figure 8A:
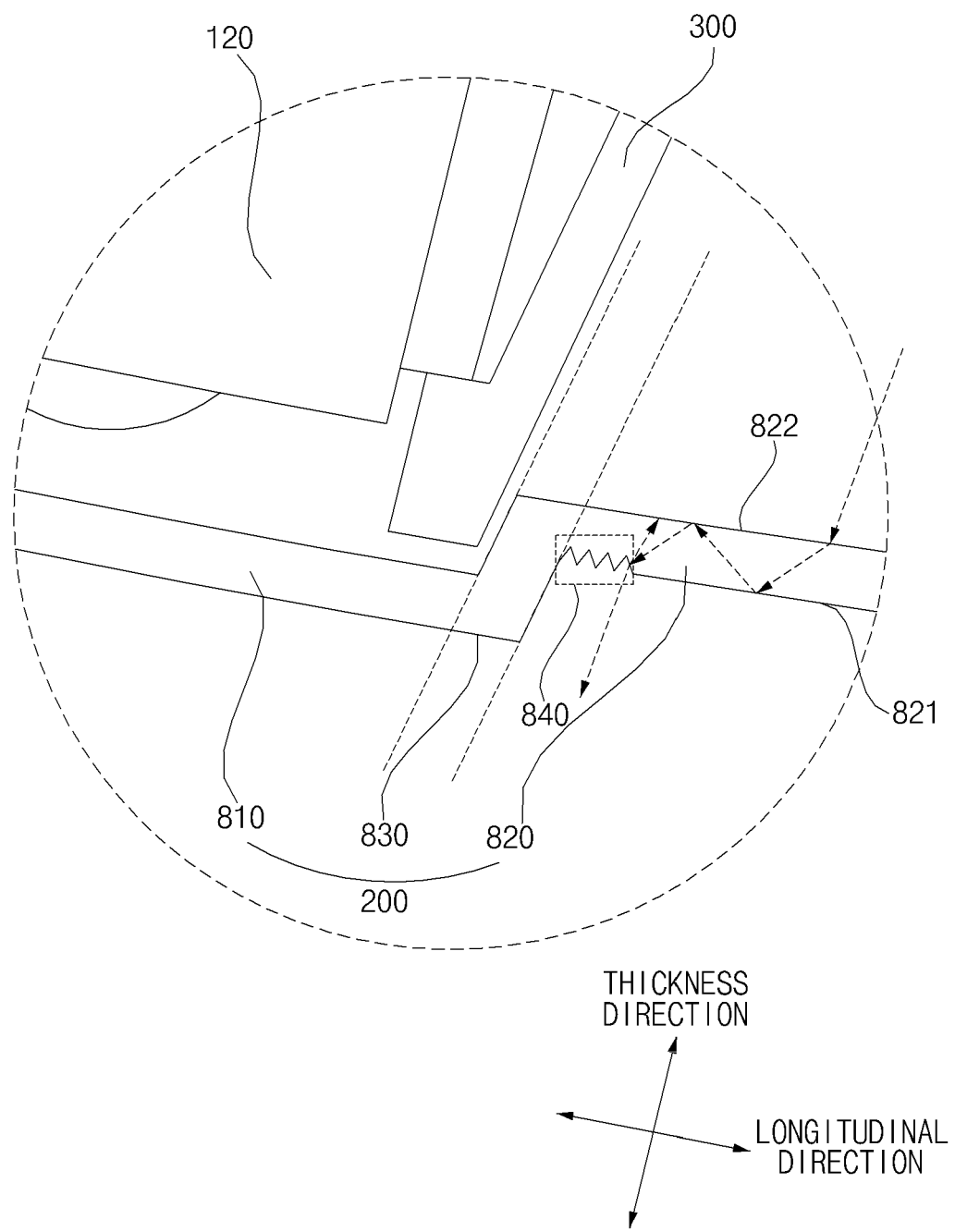
FIGS. 8A to 8D are diagrams for explaining a cover lens according to an implementation.

Referring to FIG. 8A, at least part of the cover lens 200 may be bent.

The cover lens 200 may include a first transparent member 810, a second transparent member 820, and a bent portion 830.

The cover lens 200 may be a clear lens.

The first transparent member 810 may extend from one end of the bent portion 830 in a longitudinal direction of the cover lens 200. For example, as shown in FIG. 8A, the first transparent member 810 may extend along a lateral direction of the lamp from one end of the bent portion 830.

The first transparent member 810 may protrude toward the outside of the vehicle 10 further than the second transparent member 820.

For example, when the lamp 100 is implemented as the head lamp 100a, the first transparent member 810 may protrude forward of the vehicle 10 further than the second transparent member 820.

For example, when the lamp 100 is implemented as the rear combination lamp 100b, the first transparent member 810 may protrude rearward of the vehicle 10 further than the second transparent member 820.

The first transparent member 810 may cover the sensor 120.

The second transparent member 820 may extend from the other end of the bent portion 830 in the longitudinal direction of the cover lens 200. For example, as shown in FIG. 8A, the second transparent member 820 may extend along a lateral direction of the lamp away from the other end of the bent portion 830.

The second transparent member 820 may protrude inward of the vehicle 10 further than the first transparent member 810, For example, the second transparent member 820 may protrude toward the light emitting unit 150 further than the first transparent member 810.

The second transparent member 820 may cover the light emitting unit 150.

The second transparent member 820 may include an outer side surface 821 and an inner side surface 822.

The outer side surface 821 may be a surface facing the outside of the vehicle 10.

For example, when the lamp 100 is implemented as the head lamp 100a, the outer side surface 821 may be a surface facing forward of the vehicle 10.

For example, when the lamp 100 is implemented as the rear combination lamp 100b, the outer side surface 821 may be a surface facing rearward of the vehicle 10.

As illustrated in the example of FIG. 8A, in some implementations, the cover lens 200 may include a portion that has a rough or corrugated surface, such as roughness 840.

In the example of FIG. 8A, a part of the outer side surface 821 of the second transparent member 820 may include the roughness 840.

The roughness 840 may be formed by any suitable technique, such as by erosion of a part of the outer side surface 821.

In some implementations, the roughness 840 may be formed in a region of the outer side surface 821 of the second transparent member 820 which is close to the bent portion 830. For example, one end of the roughness 840 may be connected to the bent portion 830.

The roughness 840 formed on the outer side surface 821 may be referred to as a first roughness.

The inner side surface 822 may be a surface facing inward towards an interior of the vehicle 10, and may be an opposite side from the outer side surface 821. For example, the inner side surface 822 may be a surface which faces the light emitting unit 150.

In some implementations, the bent portion 830 may be disposed between the first transparent member 810 and the second transparent member 820.

In some implementations, in addition or as an alternative to the first roughness 840 formed on the outer side surface 821 of the second transparent member 820, a second roughness may be formed on an inner side surface of the second transparent member 820.

Figure 8B:
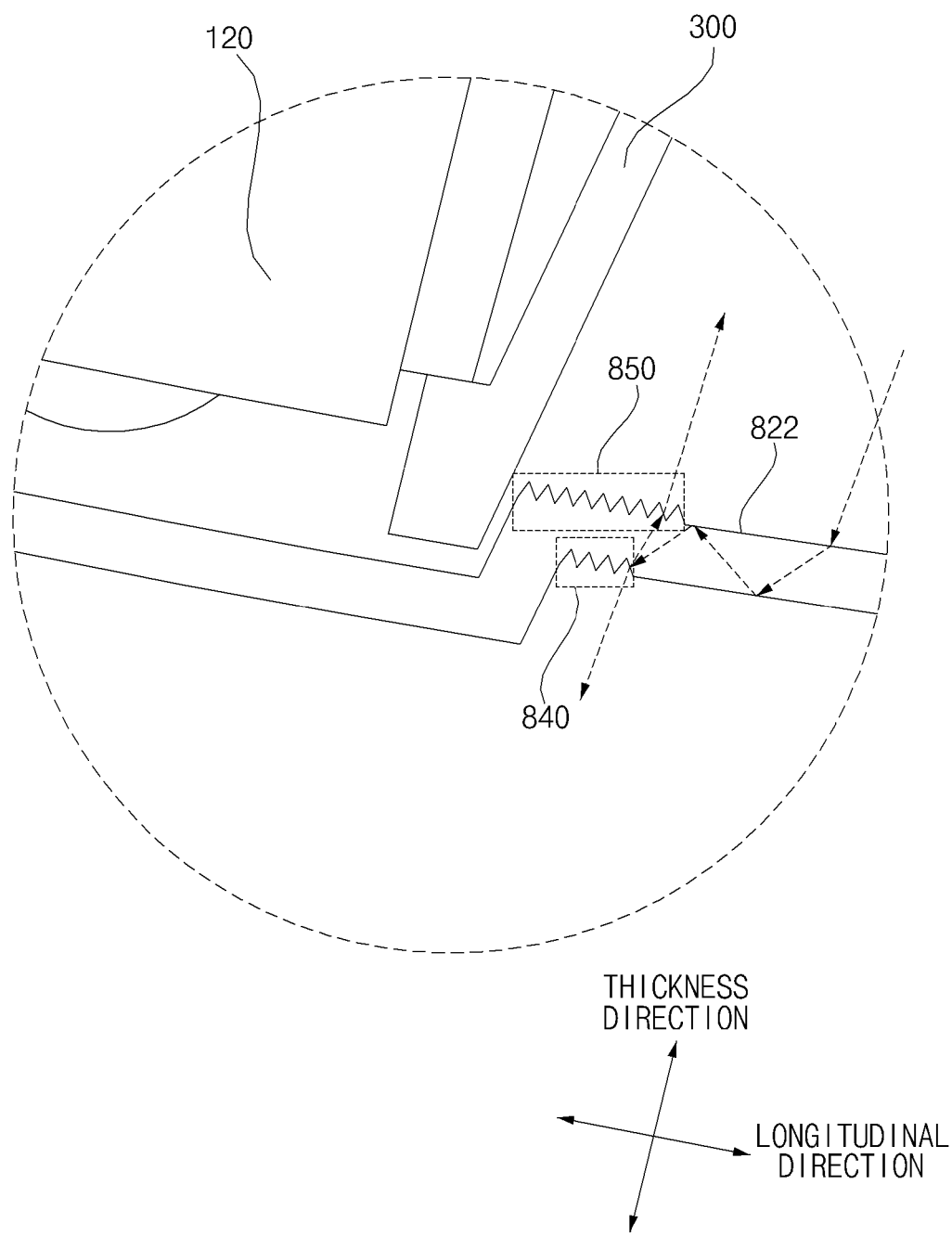

As an example, referring to FIG. 8B, a second roughness 850 may be disposed between one surface of the bent portion 830 and an inner side surface 822 of the second transparent member 820.

In some implementations, the second roughness 850 may be formed by the erosion of one surface of the bent portion 830 and a part of the inner side surface 822. The roughness 850 formed by the erosion of one surface of the bent portion 830 and a part of the inner side surface 822 may be referred to as a second roughness.

In some implementations, the second roughness 850 may have a surface area that is greater than that of the first roughness 840.

The roughness 840 and the roughness 850 may be configured to reflect and scatter light that travels through the cover lens 200. As such, light that is reflected from the roughness 840 in a scattered manner is prevented from reaching the sensor 120, thus protecting the sensor 120 from interference that may be caused by the light.

Figure 8C:
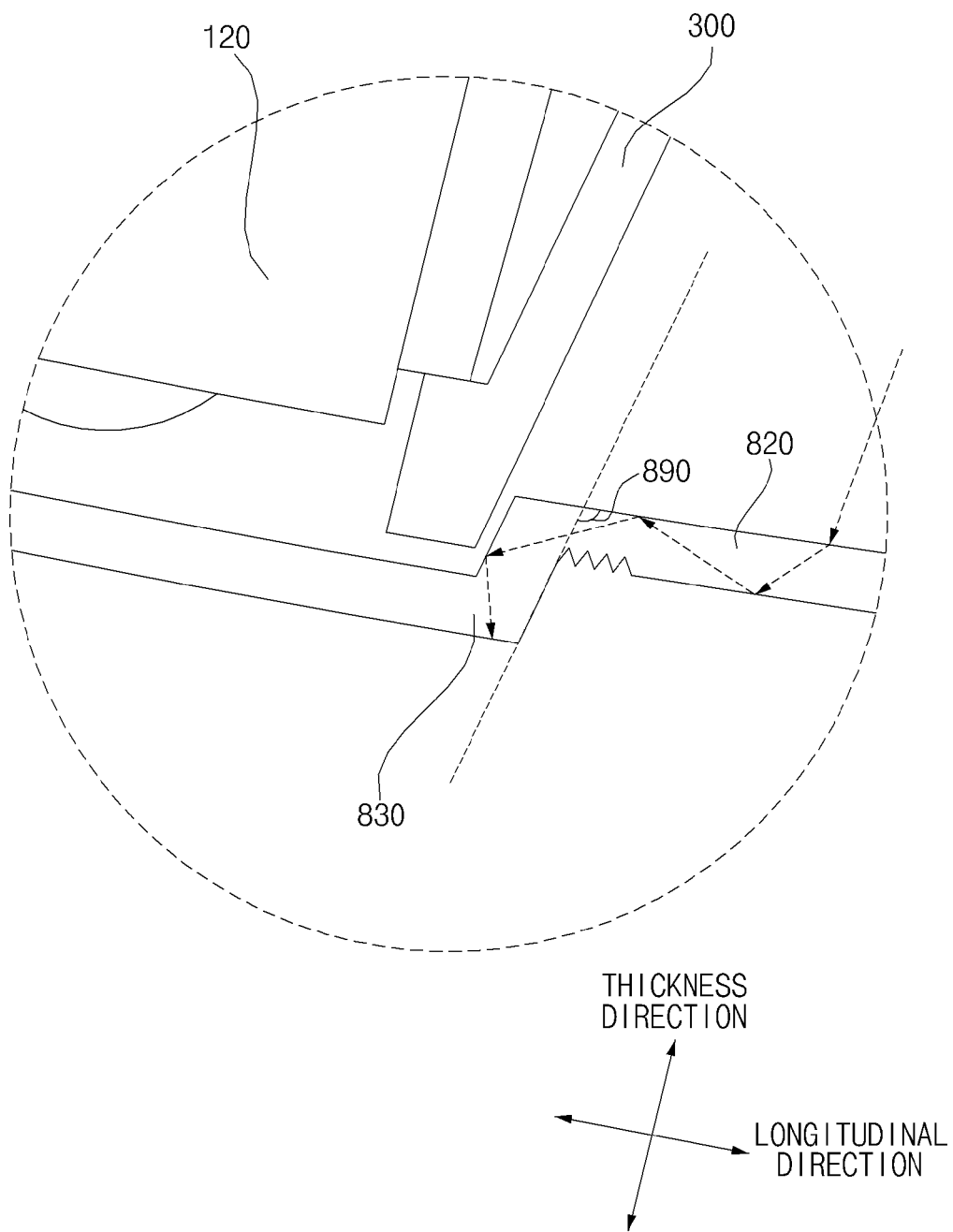

Referring to the example of FIG. 8C, the bent portion 830 may form an angle 890 relative to the second transparent member 820.

The angle 890 may be a value equal to or smaller than a reference value.

For example, the angle 890 may be equal to or smaller than 120° and equal to or greater than 90.

If the angle 890 between the bent portion 830 and the second transparent member 820 is greater than the reference value, light totally internally reflected by the cover lens 200 may reach up to the first transparent member 810.

Figure 8D:
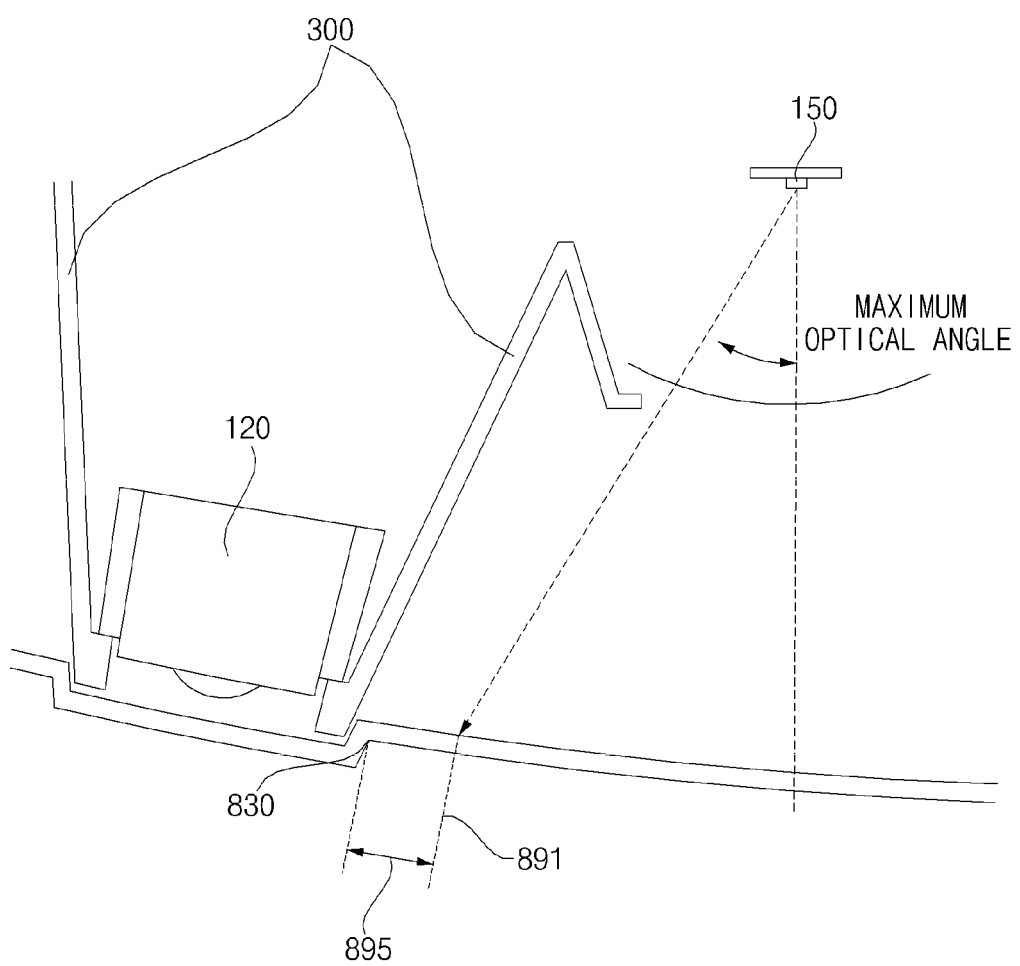

Referring to FIG. 8D, a location of the bent portion 830 may be determined based on an optical angle of light output from the light emitting unit 150.

For example, the bent portion 830 may be formed at a location which is a reference distance 895 or greater from a point 891 at which light generated by the light emitting unit 150 reaches from the cover lens 200.

As the location of the bent portion 830 is determined in the above manner, a leakage of light through the cover lens 200 is not allowed to reach the sensor 120.

Figure 9:
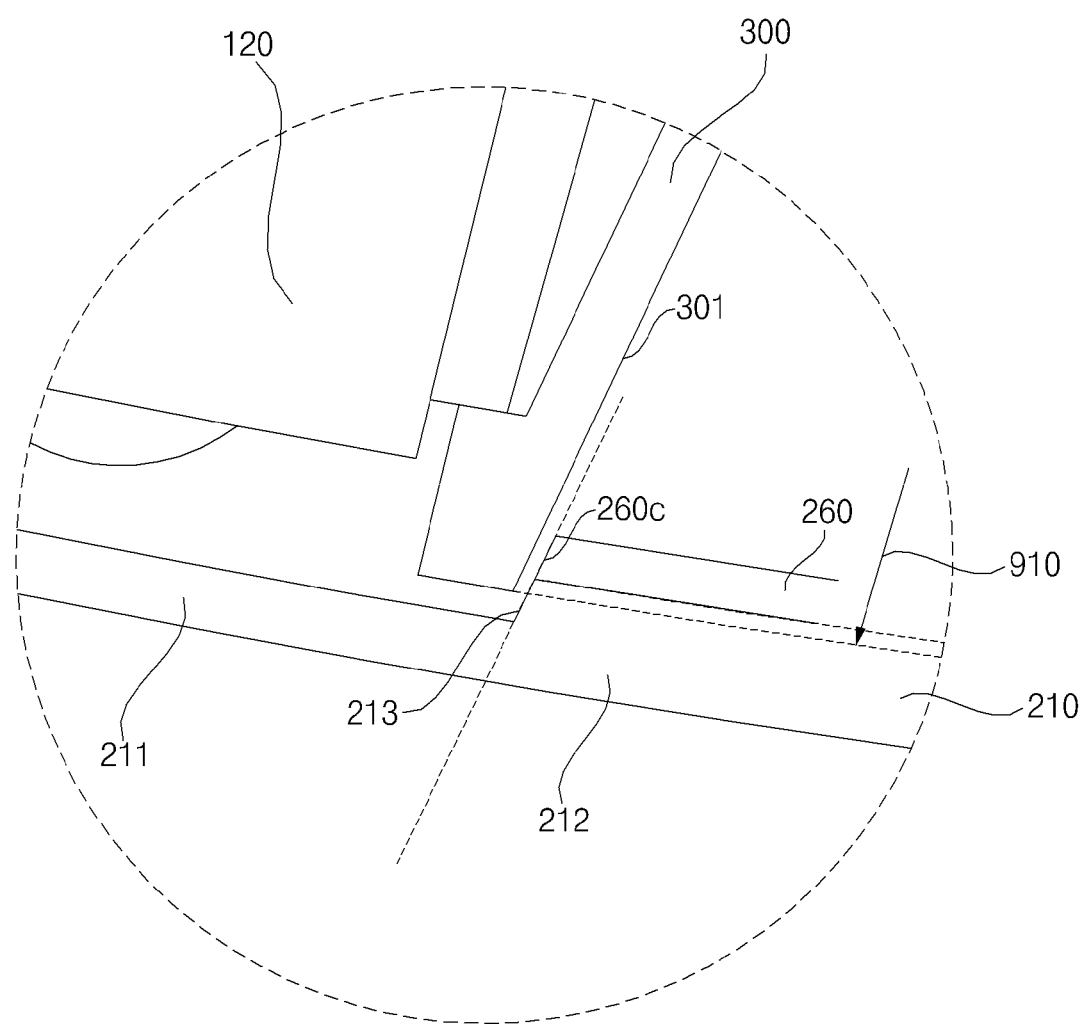
FIG. 9 is a diagram for explaining a bezel according to an implementation.

FIG. 9 is a diagram for explaining a bezel according to an implementation.

Referring to FIG. 9, the lamp 100 may further include a bezel 300.

The bezel 300 is used to hide components of the lamp 100.
The bezel 300 may be formed to embrace the sensor 120.
The bezel 300 may be disposed between the sensor 120 and the second lens 260.

One surface 301 of the bezel 300 may be disposed to face the stepped portion 213.

One surface 301 of the bezel 300 may be disposed to face the side surface 260 of the second lens 260.

The bezel 300 may be formed to protrude 910 toward the outside of the vehicle 10, compared to the second lens 260.

For example, when the lamp 100 is implemented as the head lamp 100*a*, the bezel 300 may protrude 910 toward the front side of the second lens 260 further than the second lens 260.

For example, when the lamp 100 is implemented as the rear combination lamp 100*b*, the bezel 300 may protrude toward the rear side of the lens 260 further than the second lens 260.

The bezel 300 may protrude toward the first transparent member 211 further than the second lens 260.

As the bezel 300 further protrudes than the second lens 260, it is possible to more securely prevent a leakage of light totally internally reflected by the second lens 260.

The bezel 300 may be formed of a non-transparent material.

For example, the bezel 300 may be formed of a synthetic resin material (e.g., an opaque black material) which absorbs light.

Figure 10A:
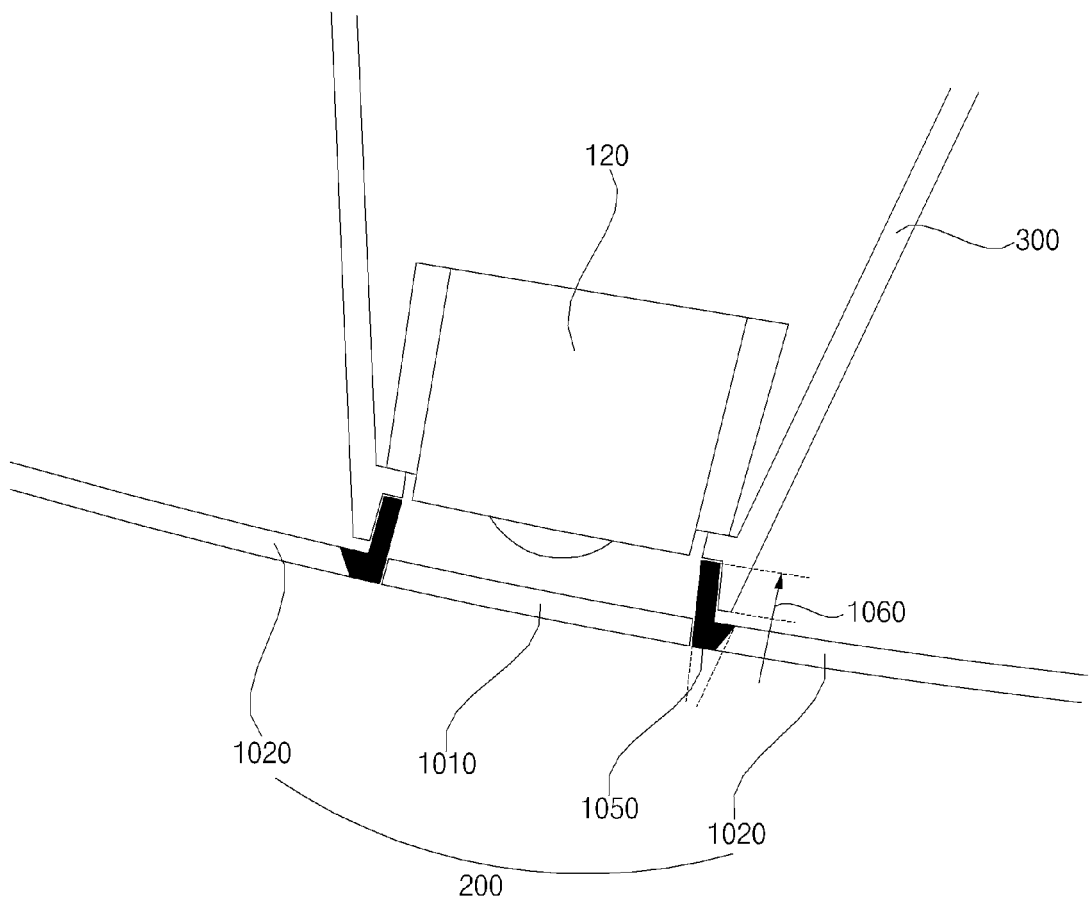
FIGS. 10A and 10B are diagram illustrating a light leak prevention unit and a cover lens according to an implementation.
Figure 10B:
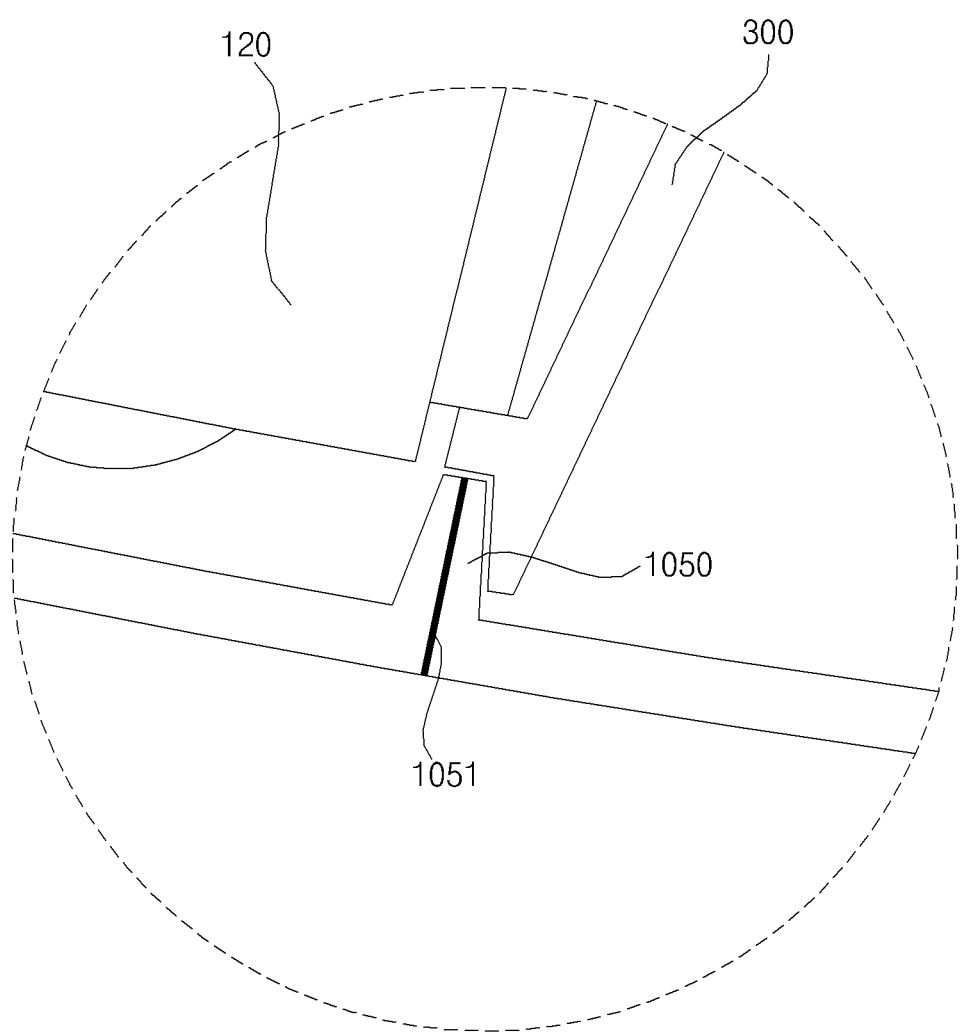

FIGS. 10A and 10B are diagram illustrating a light leak prevention unit and a cover lens according to an implementation.

Referring to FIG. 10A, the cover lens 200 may include a first transparent member 1010 and a second transparent member 1020.

The first transparent member 1010 may cover the sensor 120.

The second transparent member 1020 may cover the light emitting unit 150.

The lamp 100 may further include a light leak prevention unit 1050.

The light leak prevention unit 1050 may be formed of a non-transparent material.

For example, the light leak prevention unit 1050 may be formed of a synthetic resin material (e.g., an opaque black material) which absorbs light.

The light leak prevention unit 1050 may be disposed between the first transparent member 1010 and the second transparent member 1020.

The light leak prevention unit 1050 may protrude toward inward of the vehicle 100 further than the first transparent member 1010 and the second transparent member 1020.

As the light leak prevention unit 1050 protrudes toward inward of the vehicle 10, it is possible to more tightly prevent light leakage totally internally reflected by the cover lens 200.

Meanwhile, the cover lens 200 and the light leak prevention unit 1050 may be integrally formed by an insert-injection process.

The bezel 300 may be formed to be couple with the light leak prevention unit 1050.

For example, the light leak prevention unit 1050 may include a protrusion which protrudes toward the inside of the vehicle 10, and a recess which is recessed with respect to the inside of the vehicle 10.

For example, the bezel 300 may include a recess which is recessed with respect to the outside of the vehicle 10, and a protrusion which protrudes toward the outside of the vehicle 10. The recess and the protrusion of the bezel 300 may be configured to couple with the protrusion and the recess of the light leak prevention unit 1050, respectively.

Referring to 10G, the light leak prevention unit 1050 may be in the form of a film.

For example, the light leak prevention unit 1050 may be a light leak prevention film 1051.

For example, the cover lens 200 may include a protrusion protruding toward the side of the vehicle 10. The protrusion 1060 may include a leaking light block film provided therein.

Figure 11:
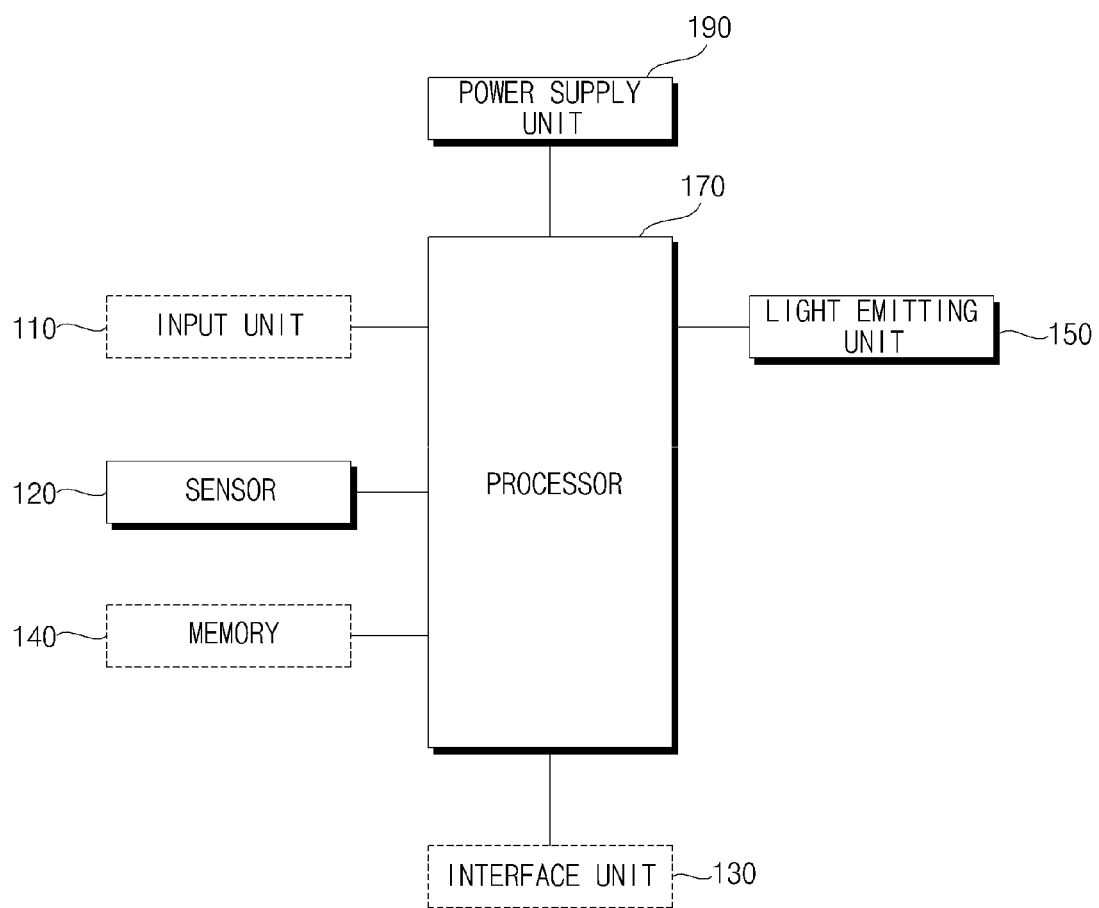
FIG. 11 is an exemplary control block diagram of a lamp for a vehicle according to an implementation.

FIG. 11 is an exemplary control block diagram of a lamp for a vehicle according to an implementation.

Referring to FIG. 11, the lamp 100 may include a sensor 120, a light emitting unit 150, a processor 170, and a power supply unit 190.

In some implementations, the lamp 100 may include an input unit, a memory 140, and an interface unit 130 individually or in a combination thereof.

The input unit 110 may receive a user input for controlling the lamp 100.

The input unit 110 may include one or more input devices. For example, the input unit 110 may include one or more of a touch input device, a mechanical input device, a gesture input device, and a voice input device.

The input device 110 may receive a user input for controlling operation of the light emitting unit 150.

For example, the input unit 110 may receive a user input for controlling turning on or off of the light emitting unit 150.

The sensor 120 is the same as described above with reference to FIGS. 1 to 10B.

The interface unit 130 may exchange information, data, or a signal with another device provided in the vehicle 10.

The interface unit 130 may transmit information, data, or a signal, received from another device provided in the vehicle 10, to the processor 170.

The interface unit 130 may transmit information, data, or a signal, generated by the processor 170, to another device provided in the vehicle 10.

The interface unit 130 may receive driving situation information.

The driving situation information may include at least one of navigation information and vehicle state information.

The navigation information may include at least one selected from among map information, information on a set destination, information on a route to the set destination, and information on various object located along the route, lane information, and information on the current location of the vehicle 10.

The navigation information may be generated by a navigation apparatus provided in the vehicle 10.

The vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The vehicle state information may be generated based on sensing information of various sensors provided in the vehicle 10.

The interface unit 130 may transmit object information to another device included in the vehicle 10.

The memory 140 may store basic data for each unit of the lamp 100, control data for the operational control of each unit of the lamp 100, and input/output data of the lamp 100.

The memory 140 may be any of various hardware storage devices, such as a ROM, a RAM, an EPROM, a flash drive, and a hard drive.

The memory 140 may store various data for the overall operation of the lamp 100, such as programs for the processing or control of the processor 170.

The memory 140 may be a subordinate element of the processor 170.

The light emitting unit 150 is the same as described above with reference to FIGS. 1 and 10B.

At least one processor, such as processor 170, may be electrically connected to each unit of the lamp 100. The processor 170 may control overall operation of each unit of the lamp 100.

The processor 170 is electrically connected to the light emitting unit 150 and the sensor 120. For example, the processor 170 may be electrically connected to the light emitting unit 150 and to the sensor 120 by wired or wireless connection.

The processor 170 may control the light emitting unit 150.

The processor 170 may control the light emitting unit 150 by adjusting an amount of electrical energy to be supplied to the light emitting unit 150.

Based on data generated by the sensor 120, the processor 170 may generate information about an object located outside the vehicle 10.

The processor 170 may provide generated object information to another vehicle included in the vehicle 10.

The processor 170 may control the light emitting unit 150 and the sensor 120 in different time periods.

For example, in a first time range, the processor 170 may control the light emitting unit 150 to emit light.

For example, in a second time range, the processor 170 may control the sensor 120 to sense an object. The second time range may continuously follow the first time range.

For example, if ambient illumination of the vehicle 10 is equal to or greater than a first reference value (e.g., during day time), the processor 170 may reduce the first time range and increase the second time range, compared to when the ambient illumination is smaller than the first reference value. During day time, the lamp 100 may operate to sense an object primarily, rather than emitting light.

For example, if ambient of the vehicle 10 is equal to or smaller then a second reference value (e.g., during night time), the processor 170 may increase the first time range and reduce the second time range, compared to when the ambient illumination of the vehicle 10 is greater than the second reference value. During night time, the lamp 100 may operate to emit light primarily, rather than sensing an object.

Under the control of the processor 170, the power supply unit 190 may supply electrical energy to each unit of the lamp 100. In particular, the power supply unit 190 may be supplied with power from a battery inside the vehicle 10.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A lamp for a vehicle, comprising:
   at least one light emitting unit;
   a sensor that is disposed around the at least one light emitting unit, and that is configured to generate data regarding an object located outside the vehicle;
   a housing configured to accommodate the at least one light emitting unit and the sensor, the housing defining an opening through which light that is emitted from the light emitting unit is projected to an outside of the vehicle; and
   a cover lens configured to cover the opening of the housing,
   wherein the cover lens comprises:
      a first lens structure having a first refractive index; and
      a second lens structure configured to contact at least one surface of the first lens structure, and having a second refractive index that is different from the first refractive index of the first lens structure, and
   wherein the first lens structure comprises:
      a first transparent member having a first thickness;
      a second transparent member that is adjacent to the first transparent member along a lateral direction of the lamp and that has a second thickness greater than the first thickness of the first transparent member, and formed to have a step with respect to the first transparent member; and
      a stepped portion formed by a difference between the first thickness of the first transparent member and the second thickness of the second transparent member.

2. The lamp according to claim 1, wherein:
   the second lens structure is arranged closer to an interior of the housing relative to the first lens structure such that light emitted from the at least one light emitting unit passes through the second lens structure before passing through the first lens structure, and
   the second refractive index of the second lens structure is smaller than the first refractive index of the first lens structure.

3. The lamp according to claim 1, wherein at least part of the first lens structure has a thickness that is greater than a thickness of the second lens structure.

4. The lamp according to claim 1, wherein the second lens structure is configured to be arranged in close contact with at least one surface of the first lens structure.

5. The lamp according to claim 1, wherein an edge of the second lens structure is formed in a curved shape.

6. The lamp according to claim 1, wherein the second lens structure is configured to contact a first surface of the second transparent member, and a side surface of the second lens structure extends from the stepped portion of the first lens structure towards an interior of the lamp.

7. The lamp according to claim 1, wherein the second lens structure extends in a longitudinal direction thereof and along the lateral direction of the lamp to the stepped portion of the first lens structure.

8. The lamp according to claim 1, wherein the first transparent member is configured to cover a first portion of the opening corresponding to the sensor, and the second transparent member is configured to cover a second portion of the opening corresponding to the at least one light emitting unit.

9. The lamp according to claim 1, further comprising a bezel disposed between the sensor and the second lens structure.

10. The lamp according to claim 9, wherein a first surface of the bezel is arranged to face the stepped portion of the first lens structure in the lateral direction of the lamp.

11. The lamp according to claim 9, wherein the bezel is arranged to protrude in a direction toward the first transparent member further than the second lens structure.

12. The lamp according to claim 9, wherein the bezel is composed of a non-transparent material.

13. A lamp for a vehicle, comprising:
   at least one light emitting unit;
   a sensor that is disposed around the at least one light emitting unit, and that is configured to generate data regarding an object located outside the vehicle;
   a housing configured to accommodate the at least one light emitting unit and the sensor, the housing defining an opening through which light that is emitted from the light emitting unit is projected to an outside of the vehicle;
   a cover lens configured to cover the opening of the housing; and
   a light leak prevention structure formed of a non-transparent material,
   wherein the cover lens comprises:
      a first transparent member configured to cover a first portion of the opening corresponding to the sensor; and
      a second transparent member configured to cover a second portion of the opening corresponding to the at least one light emitting unit,
   wherein the first transparent member and the second transparent member are arranged along a lateral direction of the lamp, and
   wherein light leak prevention structure is interposed between the first transparent member and the second transparent member.

14. The lamp according to claim 13, further comprising a bezel arranged to be coupled with the light leak prevention structure.

15. The lamp according to claim 1, further comprising at least one processor that is electrically connected to the at least one light emitting unit and to the sensor.

16. The lamp according to claim 15, wherein the at least one processor is configured to control the at least one light emitting unit and the sensor in an alternating manner in which the at least one light emitting unit and the sensor are activated in different time periods.

17. The lamp according to claim 1, wherein the sensor comprises at least one of a camera, a Light Detection And Ranging (LIDAR) sensor, a Radio Detection And Ranging (RADAR) sensor, an ultrasonic sensor, or an infrared sensor.

18. A lamp for a vehicle, comprising:
   at least one light emitting unit;
   a sensor that is disposed around the at least one light emitting unit, and that is configured to generate data regarding an object located outside the vehicle;
   a housing configured to accommodate the at least one light emitting unit and the sensor, the housing defining an opening through which light that is emitted from the light emitting unit is projected to an outside of the vehicle; and a cover lens configured to cover the opening of the housing,
wherein the cover lens comprises:
a first transparent member configured to cover a first portion of the opening corresponding to the sensor;
a second transparent member configured to cover a second portion of the opening corresponding to the at least one light emitting unit; and
a bent portion arranged laterally between and connecting the first transparent member and the second transparent member,
wherein the first transparent member and the second transparent member are arranged along a lateral direction of the lamp,
wherein the bent portion is formed so that second transparent member is arranged closer to an interior of the lamp relative to the first transparent member, and
wherein the cover lens further comprises a corrugation portion formed on at least one surface of the second transparent member adjacent to the bent portion.

19. A vehicle comprising:
a plurality of wheels;
a power source configured to power a rotation of at least one of the plurality of wheels; and
a lamp comprising:
at least one light emitting unit;
a sensor that is disposed around the at least one light emitting unit, and that is configured to generate data regarding an object located outside the vehicle;
a housing configured to accommodate the at least one light emitting unit and the sensor, the housing defining an opening through which light that is emitted from the light emitting unit is projected to an outside of the vehicle; and
a cover lens configured to cover the opening of the housing,
wherein the cover lens comprises:
a first lens structure having a first refractive index; and
a second lens structure configured to contact at least one surface of the first lens structure, and having a second refractive index that is different from the first refractive index of the first lens structure,
wherein the first lens structure comprises:
a first transparent member having a first thickness;
a second transparent member that is adjacent to the first transparent member along a lateral direction of the lamp and that has a second thickness greater than the first thickness of the first transparent member, and formed to have a step with respect to the first transparent member; and
a stepped portion formed by a difference between the first thickness of the first transparent member and the second thickness of the second transparent member.

20. A vehicle comprising:
a plurality of wheels;
a power source configured to power a rotation of at least one of the plurality of wheels; and
a lamp comprising:
at least one light emitting unit;
a sensor that is disposed around the at least one light emitting unit, and that is configured to generate data regarding an object located outside the vehicle;
a housing configured to accommodate the at least one light emitting unit and the sensor, the housing defining an opening through which light that is emitted from the light emitting unit is projected to an outside of the vehicle;
a cover lens configured to cover the opening of the housing; and
a light leak prevention structure formed of a non-transparent material,
wherein the cover lens comprises:
a first transparent member configured to cover a first portion of the opening corresponding to the sensor; and
a second transparent member configured to cover a second portion of the opening corresponding to the at least one light emitting unit,
wherein the first transparent member and the second transparent member are arranged along a lateral direction of the lamp, and
wherein light leak prevention structure is interposed between the first transparent member and the second transparent member.

21. A vehicle comprising:
a plurality of wheels;
a power source configured to power a rotation of at least one of the plurality of wheels; and
a lamp comprising:
at least one light emitting unit;
a sensor that is disposed around the at least one light emitting unit, and that is configured to generate data regarding an object located outside the vehicle;
a housing configured to accommodate the at least one light emitting unit and the sensor, the housing defining an opening through which light that is emitted from the light emitting unit is projected to an outside of the vehicle; and
a cover lens configured to cover the opening of the housing,
wherein the cover lens comprises:
a first transparent member configured to cover a first portion of the opening corresponding to the sensor;
a second transparent member configured to cover a second portion of the opening corresponding to the at least one light emitting unit; and
a bent portion arranged laterally between and connecting the first transparent member and the second transparent member,
wherein the first transparent member and the second transparent member are arranged along a lateral direction of the lamp,
wherein the bent portion is formed so that second transparent member is arranged closer to an interior of the lamp relative to the first transparent member, and
wherein the cover lens further comprises a corrugation portion formed on at least one surface of the second transparent member adjacent to the bent portion.

* * * * *